United States Patent
Nonnenmann et al.

(10) Patent No.: US 8,957,758 B2
(45) Date of Patent: Feb. 17, 2015

(54) CLEANING APPLIANCE

(71) Applicant: Alfred Kärcher GmbH & Co. KG, Winnenden (DE)

(72) Inventors: Frank Nonnenmann, Schorndorf (DE); Michael Schuetz, Stuttgart (DE); Rainer Schaefer, Leutenbach (DE)

(73) Assignee: Alfred Kärcher GmbH & Co. KG, Winnenden (DE)

( * ) Notice: Subject to any disclaimer, the term of this patent is extended or adjusted under 35 U.S.C. 154(b) by 214 days.

(21) Appl. No.: 13/749,617

(22) Filed: Jan. 24, 2013

(65) Prior Publication Data

US 2013/0135079 A1 May 30, 2013

Related U.S. Application Data

(63) Continuation of application No. PCT/EP2011/062569, filed on Jul. 21, 2011.

(30) Foreign Application Priority Data

Jul. 26, 2010 (DE) .......................... 10 2010 038 421

(51) Int. Cl.
   *G05B 19/00* (2006.01)
   *B60R 25/00* (2013.01)
   (Continued)

(52) U.S. Cl.
   CPC .................. *G05B 1/01* (2013.01); *A47L 9/2805* (2013.01); *A47L 9/2857* (2013.01); *A47L 9/2889* (2013.01); *E05B 35/001* (2013.01); *E05B 35/10* (2013.01); *E05B 35/14* (2013.01); *G07C 9/00007* (2013.01)
   USPC ............. 340/5.6; 340/5.72; 340/5.74; 701/29

(58) Field of Classification Search
   CPC G07C 9/00309; G07C 9/00007; E05B 19/04; E05B 35/001; E05B 39/00
   USPC ............................ 340/5.6, 5.72, 5.74; 701/29
   See application file for complete search history.

(56) References Cited

U.S. PATENT DOCUMENTS 3,142,771 A    7/1964   Wendt
3,379,295 A    4/1968   Varley
(Continued)

FOREIGN PATENT DOCUMENTS

DE       43 29 677 A1    3/1995
DE       295 16 666 U1    2/1996
(Continued)

*Primary Examiner* — George Bugg
*Assistant Examiner* — Munear Akki
(74) *Attorney, Agent, or Firm* — Womble Carlyle Sandridge & Rice, LLP (57) ABSTRACT

A cleaning appliance is provided including at least one authorization carrier with an access authorization which is provided thereon and is required for accessing the cleaning appliance, just one receptacle in which the at least one authorization carrier is positionable, and a detection unit, situated at the receptacle, for contact-based detection of the access authorization of an authorization carrier positioned in the receptacle, the detection unit having at least one detection contact element which contacts the access authorization. To provide a cleaning appliance of this type which is usable with greater versatility, it is proposed that the cleaning appliance include two or more authorization carriers with access authorizations provided thereon which are linked to different authorization profiles, wherein a range of functions dependent on the authorization profile linked to an access authorization can be provided to an operator by the cleaning appliance.

19 Claims, 5 Drawing Sheets

(51) Int. Cl.
*G01M 17/00* (2006.01)
*G05B 1/01* (2006.01)
*A47L 9/28* (2006.01)
*E05B 35/00* (2006.01)
*E05B 35/10* (2006.01)
*E05B 35/14* (2006.01)
*G07C 9/00* (2006.01)

(56) References Cited

U.S. PATENT DOCUMENTS

| | | | |
|---|---|---|---|
| 3,569,981 A | 3/1971 | Hampton et al. | |
| 4,077,242 A | 3/1978 | Sedley | |
| 4,492,002 A * | 1/1985 | Waldhauser et al. | 15/320 |
| 4,707,788 A * | 11/1987 | Tashiro et al. | 701/49 |
| 4,805,258 A * | 2/1989 | Sitarski et al. | 15/385 |
| 5,187,665 A * | 2/1993 | Futami et al. | 701/49 |
| 5,311,757 A | 5/1994 | Spahn | |
| 5,775,148 A | 7/1998 | Layton et al. | |
| 7,096,496 B1 * | 8/2006 | Challener et al. | 726/17 |
| 2001/0034257 A1 | 10/2001 | Weston et al. | |
| 2004/0246095 A1 | 12/2004 | Berger et al. | |
| 2004/0252014 A1 * | 12/2004 | Emmerling et al. | 340/5.62 |
| 2006/0103523 A1 * | 5/2006 | Field | 340/540 |
| 2007/0225860 A1 | 9/2007 | Sheppard et al. | |
| 2008/0113709 A1 | 5/2008 | Beadell et al. | |
| 2008/0176645 A1 | 7/2008 | Griswold et al. | |
| 2008/0235614 A1 | 9/2008 | Ricklefs et al. | |
| 2008/0283585 A1 | 11/2008 | Peterman et al. | |
| 2009/0078762 A1 | 3/2009 | Forster et al. | |
| 2009/0132090 A1 * | 5/2009 | Kaczmarz et al. | 700/275 |
| 2010/0044441 A1 * | 2/2010 | Cohen et al. | 235/469 |
| 2010/0154484 A1 | 6/2010 | Skoric et al. | |
| 2011/0084840 A1 * | 4/2011 | Mercier et al. | 340/572.1 |
| 2011/0090277 A1 | 4/2011 | Pomerantz et al. | |
| 2011/0161573 A1 | 6/2011 | Cheng | |
| 2012/0154116 A1 | 6/2012 | Duenne et al. | |

FOREIGN PATENT DOCUMENTS

| | | |
|---|---|---|
| DE | 296 04 605 U1 | 7/1996 |
| DE | 195 37 605 A1 | 4/1997 |
| DE | 197 53 086 A1 | 6/1999 |
| EP | 0 844 030 A2 | 5/1998 |
| EP | 1 315 128 A1 | 5/2003 |
| EP | 1 593 334 A2 | 11/2005 |
| GB | 2 352 057 A | 1/2001 |
| GB | 2 353 180 A | 2/2001 |
| WO | WO 00/65602 | 11/2000 |

* cited by examiner

CLEANING APPLIANCE

CROSS-REFERENCE TO RELATED APPLICATIONS

This application is a continuation of international application number PCT/EP2011/062569, filed on Jul. 21, 2011, which claims priority to German application number DE 10 2010 038 421.6, filed Jul. 26, 2010. The contents of both applications are incorporated by reference herein in their entirety and for all purposes.

FIELD OF THE INVENTION

The present invention relates to a cleaning appliance comprising at least one authorization carrier with an access authorization which is provided thereon and is required for accessing the cleaning appliance, just one receptacle in which the at least one authorization carrier is positionable, and a detection unit, situated at the receptacle, for contact-based detection of the access authorization of an authorization carrier positioned in the receptacle, the detection unit having at least one detection contact element which contacts the access authorization.

BACKGROUND OF THE INVENTION

In this type of cleaning appliance, access control is obtained using an authorization carrier, for example a key, on which the access authorization is provided. The receptacle may be a key slot, for example. For the purpose of access control, it must be ensured that only an authorized, trained user operates the cleaning appliance. This avoids improper operation and an associated risk not only of damage to the cleaning appliance, but also of injury to the operator or third parties. Examples of cleaning appliances requiring access authorization are scrubber vacuums, mobile sweepers, and cleaning appliances which operate by means of a cleaning jet, in particular heatable high-pressure cleaners or particle blasting devices such as dry ice blasters.

The detection of the access authorization of an authorization carrier requires that the authorization carrier be positioned in the just one receptacle. As a result, the detection unit contacts the access authorization by means of the at least one detection contact element, and detects in this way. For example, the at least one detection contact element may contact the access authorization electrically or mechanically.

It is an object underlying present invention to provide a cleaning appliance of the generic kind which is usable with greater versatility.

SUMMARY OF THE INVENTION

In an aspect of the invention, a cleaning appliance comprises at least one authorization carrier with an access authorization which is provided thereon and is required for accessing the cleaning appliance, just one receptacle in which the at least one authorization carrier is positionable, and a detection unit, situated at the receptacle, for contact-based detection of the access authorization of an authorization carrier positioned in the receptacle, the detection unit having at least one detection contact element which contacts the access authorization. The cleaning appliance comprises two or more authorization carriers with access authorizations provided thereon which are linked to different authorization profiles, wherein a range of functions dependent on the authorization profile linked to the access authorization can be provided to an operator by the cleaning appliance.

BRIEF DESCRIPTION OF THE DRAWING FIGURES

The foregoing summary and the following description may be better understood in conjunction with the drawing figures, of which.

DETAILED DESCRIPTION OF PREFERRED EMBODIMENTS OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a cleaning appliance comprising at least one authorization carrier with an access authorization which is provided thereon and is required for accessing the cleaning appliance, just one receptacle in which the at least one authorization carrier is positionable, and a detection unit, situated at the receptacle, for contact-based detection of the access authorization of an authorization carrier positioned in the receptacle, the detection unit having at least one detection contact element which contacts the access authorization. The cleaning appliance comprises two or more authorization carriers with access authorizations provided thereon which are linked to different authorization profiles, wherein a range of functions dependent on the authorization profile linked to the access authorization can be provided to an operator by the cleaning appliance.

The cleaning appliance according to an aspect of the invention comprises two or more authorization carriers of different authorization profiles, wherein in the present context, "authorization profile of the authorization carrier" is the authorization profile which is linked to the access authorization provided on the authorization carrier. The range of functions of the cleaning appliance is determined based on the authorization profile. Depending on which authorization carrier an operator uses for accessing the cleaning appliance, the operator may perform different functions of the cleaning appliance. This allows, for example, the operator to be provided with different authorization carriers, depending on experience in handling the cleaning appliance and/or range of duties. Thus, for example, it may be provided that an authorization carrier provided for operators with "standard experience" grants access to the most common functions of the cleaning appliance. For example, an operator with "standard experience" may use functional units of the cleaning appliance such as a cleaning tool, a dirt pick-up device, or a cleaner dispensing device, but is not able to change operating parameters of these functional units. More experienced operators may be provided with authorization carriers whose authorization profile grants access to further functions of the cleaning appliance. For example, more experienced users may also adjust cleaning parameters themselves, such as contact pressure of the cleaning tool or the quantity of cleaning fluid used.

Lastly, authorization carriers provided for maintenance personnel may be provided, by use of which the entire range of functions of the cleaning appliance may be utilized.

Apart from the just one receptacle, no further receptacle is present for detecting the different access authorizations of the authorization carriers of different authorization profiles. This allows a configuration of the cleaning appliance having a simple design, and at the same time simplifies operation thereof for the operator. Regardless of the authorization profile, the operator may always position the authorization carrier in the same receptacle in order to obtain access to the cleaning appliance.

It is advantageous for the at least one detection contact element to form a switching element which is activatable by contact with the access authorization. Contact between the access authorization and the at least one detection contact element may thus be used, by means of a simple design, for detecting the access authorization by the detection unit. The at least one switching element may be an electrical and/or mechanical switching element.

The detection unit preferably has two or more detection contact elements which form two or more switching elements that are activatable in dependence on the particular access authorization of an authorization carrier. The two or more switching elements allow detection of the different access authorizations which are linked to different authorization profiles. Depending on the configuration of the access authorization on the particular authorization carrier, different detection contact elements of the two or more detection contact elements are contacted, and thus, different switching elements of the two or more switching elements are activated for detecting the access authorization.

It is advantageous if the cleaning appliance includes a control unit, coupled to the at least one switching element, by means of which the activation of the at least one switching element is detectable. This allows the access authorization, which is detected by the detection unit based on the at least one detection contact element, to be transmitted to the control unit, in a manner of speaking, by the activation of the at least one switching element. By using the control unit it may then be determined, for example, which authorization profile is linked to the detected access authorization.

It is advantageous if the cleaning appliance includes a memory unit which is coupled to the control unit and which stores the authorization profile linked to an access authorization. After the access authorization is detected, the control unit may read from the memory unit the authorization profile that is linked to the particular access authorization. The authorization profile allows the control unit to determine which range of functions is to be provided to the operator by use of the authorization carrier utilized. For example, the authorization profile stores how functional units of the cleaning appliance, such as a cleaning tool, a dirt pick-up device, or a cleaner dispensing device, may be controlled in dependence on the authorization profile.

For an authorization profile which is reserved for a maintenance person, it may be provided that the operator is granted access to an interface via which software updates may be transmitted to the control unit. The operator may also be granted access to an interface via which information concerning the status of the cleaning appliance may be queried and modified.

It is advantageous for the authorization carriers to be configured as keys, and for the receptacle to be a key slot for the keys. This allows a configuration of the cleaning appliance having a simple design. The access authorization of an authorization carrier which is configured as a key is formed, for example, by projections and/or setbacks and/or recesses provided thereon.

The cleaning appliance preferably comprises a plurality of authorization carriers having the same authorization profile in order to provide a plurality of operators with an authorization carrier which grants access to the same range of functions of the cleaning appliance.

The cleaning appliance preferably comprises a plurality of authorization carriers having identical access authorizations provided thereon. This also allows a plurality of operators access to the cleaning appliance while providing the same range of functions.

It is advantageous if the authorization profiles of the authorization carriers define authorization stages which build on one another, whereby when a higher-order authorization stage is present, the cleaning appliance may provide the range of functions of a lower-order authorization stage and at least one additional function. This allows the range of functions to be tiered, and to be provided as needed in dependence on the level of knowledge and/or range of duties of the operator. It may be provided in particular that the number of authorization carriers of a higher-order authorization stage is less than the number of authorization carriers of a lower authorization stage. This takes into account the fact that the cleaning appliance is customarily operated by a plurality of users with "standard experience," but only by a small number of persons who are authorized for maintenance.

Each authorization carrier preferably includes an identification device for providing an identifier which is associated with the particular authorization profile of the authorization carrier and which is perceivable by the operator using a sensory organ, wherein identifiers associated with different authorization profiles are different from one another. This allows the operator to easily determine, using a sensory organ, what type of authorization profile the authorization carrier has, i.e., which is linked to the access authorization provided on the authorization carrier. In particular it is not necessary to put the cleaning appliance into operation in order to check, in the worst case, all authorization carriers as to whether they have the authorization profile expected by the operator.

It is advantageous for the cleaning appliance to comprise a plurality of authorization carriers having the same authorization profile, and for the plurality of authorization carriers to have identical identifiers, to simplify handling of the authorization carriers and operation of the cleaning appliance. In particular, an unambiguous association of the identifier and the authorization profiles with one another may be achieved in this way.

The identifiers of all authorization carriers are preferably perceivable using the same sensory organ in order to simplify handling of the authorization carriers, and thus, of the cleaning appliance, for operators. The operator may thus become accustomed more quickly to the fact that the authorization profile may be deduced based on an identifier which is always perceivable by the same sensory organ.

It is advantageous if at least one identification device is an optical identification device having a visually perceivable identifier; i.e., the identifier provided by the optical identification device is detectable by the operator's sense of vision. An optical identification device, for example a display unit, allows the identifier to be reliably perceived. The identification devices of all authorization carriers are advantageously optical identification devices.

In an embodiment of the cleaning appliance which has particular ease of handling, the visually perceivable identifier is a color, for example a basic color such as yellow or green. Also possible is a specific color of a color system, for example a specific Pantone color. A colored identifier of the authorization carrier, which may be present, for example, in partially or completely colored form, is perceivable in a particularly simple and reliable manner.

Similarly, it may be provided that the identifier includes a color, and is present, for example, in a specific spatial configuration of a plurality of colors, such as a color gradient.

It may be provided that at least one identification device is a haptic identification device having an identifier which is perceivable by touch, the identifier being detectable by the operator's sense of touch. In practice, this type of identifier may also be detected in a user-friendly and reliable manner. The identifier which is perceivable by touch includes, for example, elevations and/or depressions which are formed on the authorization carrier. This may be implemented with a simple design. It may also be provided that an identifier which is perceivable by touch is characterized in that the authorization carrier includes no elevations and/or depressions, and accordingly has a smooth surface characteristic.

It is advantageous if the identifier of at least one authorization carrier, and preferably of all authorization carriers, is situated on a surface of the authorization carrier or the authorization carriers. This allows an identifier for each authorization carrier which has a simple design and is easy to perceive. The surface thereof forms, at least in part, an identifier area on which the identifier is situated. Examples of authorization carriers with identifier at the surface are authorization carriers which at the surface are at least partially colored and/or provided with depressions and/or elevations. The corresponding identification device of such an authorization carrier is formed, for example, by the surface including at least one characterizing element, such as a colored layer, or an elevation or a depression, present thereon in a specific spatial configuration.

The identifier particularly preferably extends over the entire surface of the authorization carrier, but not necessarily its edges, corners, or the like. This involves a type of identifier having a particularly simple design, which is also perceivable by the operator in a particularly reliable manner. For example, the entire surface of the authorization carrier is colored, authorization carriers having different authorization profiles being colored differently. Similarly, it may be provided that the entire surface of an authorization carrier is provided with depressions and/or elevations, authorization carriers of different authorization profiles including different types or a different spatial arrangement of elevations and/or depressions, or managing entirely without elevations and/or depressions.

It is advantageous if the cleaning appliance includes a playback device for providing authorization information which is perceivable by the operator using a sensory organ, the authorization information being associated with the authorization profile of an authorization carrier used by the operator for accessing the cleaning appliance. A control option which is easily and reliably perceivable is thus provided for the operator in order to determine whether the authorization profile of the authorization carrier used by the operator is the authorization profile expected by the operator, or whether a misidentification of the authorization carrier is possibly present.

In practice, it proves advantageous for the playback device to include an optical display unit for providing visually perceivable authorization information. The authorization information may thus be easily perceived by the operator via the sense of vision. A display unit, which in particular is present on the cleaning appliance and which displays status information for the cleaning appliance, may be used as the display unit.

In the case of an identifier of the authorization profile of the authorization carrier based on a color, the authorization information is preferably a display color of the display unit. This may be a background color or a foreground color, such as a text color, of the display unit.

The color of the identifier and of the display color of the display unit preferably match to allow the operator to easily and intuitively perceive the authorization information. In particular, it may be provided that for a colored identifier of the authorization profile on each authorization carrier, the authorization information in every case is a display color which matches the identifier color.

A cleaning appliance according to an aspect of the invention may be configured as a floor cleaning machine, for example as a scrubber vacuum or a mobile sweeper, both as so-called "walk-behind" machines in which the operator controls the machines from the rear, and also as ride-on machines.

Figure 1:
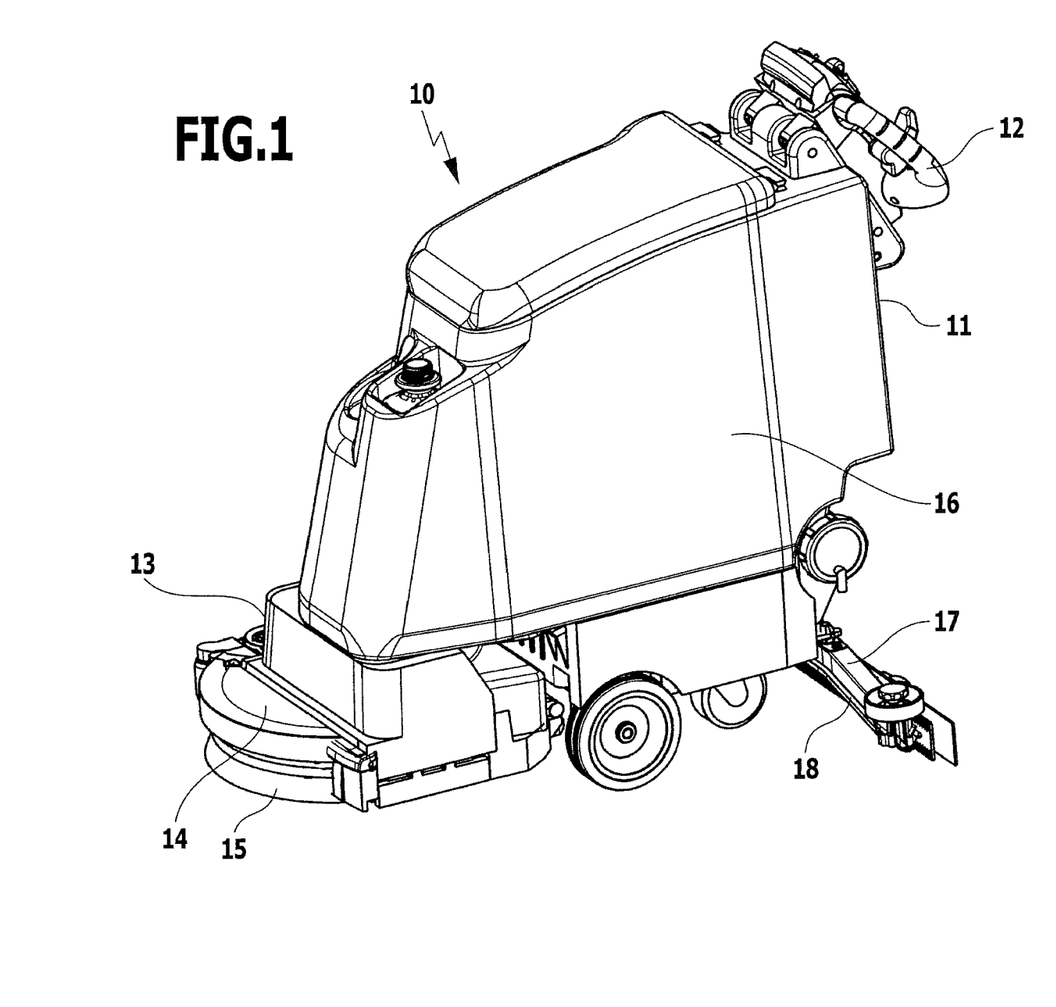
FIG. 1 shows a perspective view of a cleaning appliance according to an aspect of the invention.

A preferred embodiment of a cleaning appliance according to the invention is configured as a scrubber vacuum, which is illustrated in perspective in FIG. 1 and denoted overall by reference numeral 10. The scrubber vacuum 10 is a so-called "walk-behind" machine which an operator controls from the rear 11 of the machine with the aid of an operating unit 12 situated thereon.

At its front 13, the scrubber vacuum 10 has a cleaning tool 14 with a rotary disk brush 15, by means of which dirt may be removed from a floor surface to be cleaned. To increase the cleaning action, the floor surface may be acted on by a cleaning fluid, such as water, contained in a tank 16. At the rear 11, the scrubber vacuum 10 includes a dirt pick-up device 17 in the form of a suction bar 18 for suctioning the mixture of removed dirt and water from the floor surface.

Figure 2:
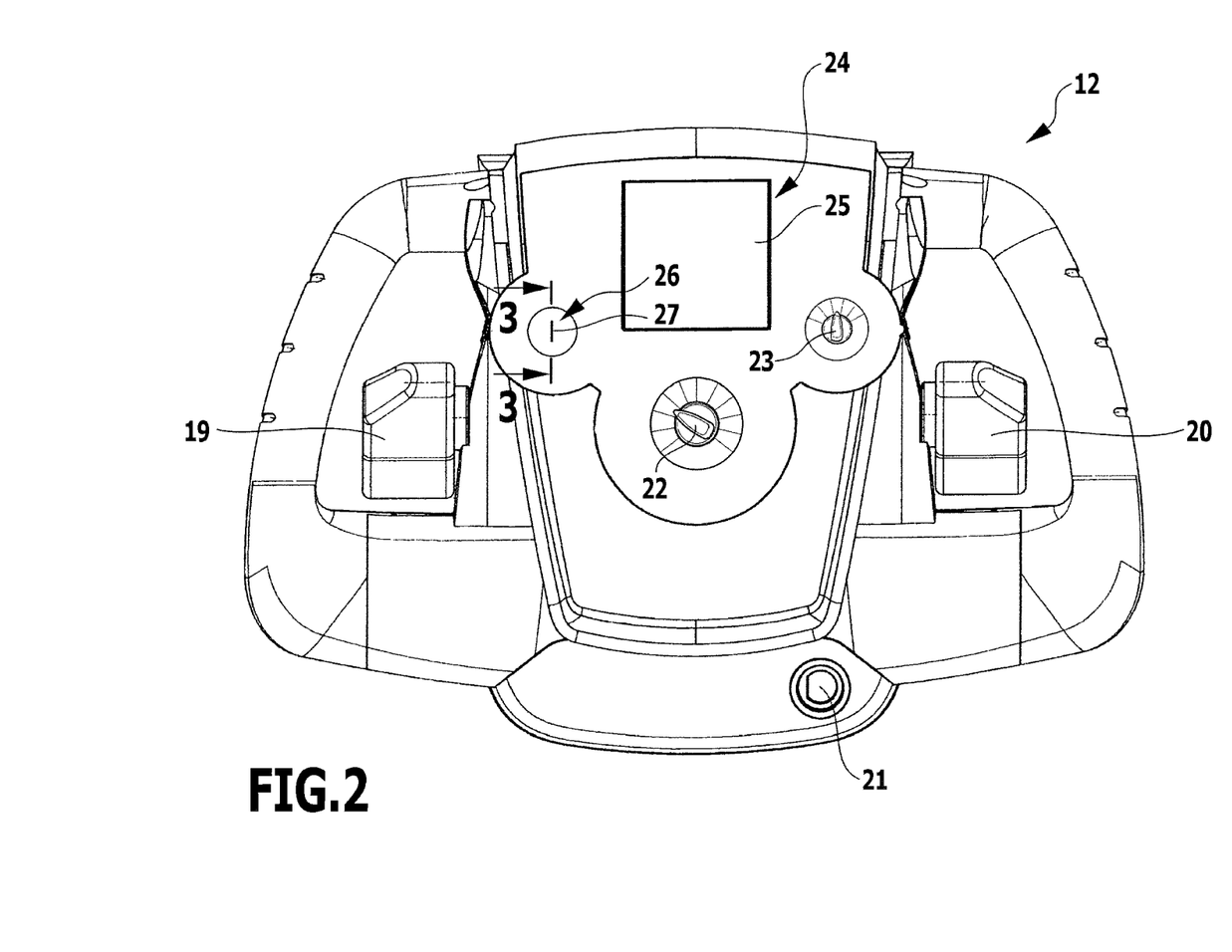
FIG. 2 shows a top view of an operating unit of the cleaning appliance from FIG. 1, including a receptacle for authorization carriers.

The operating unit 12 illustrated in a top view in FIG. 2 includes a plurality of operating elements 19 to 23, which are not discussed in greater detail below, for receiving operating instructions from an operator. The operating unit 12 also includes a playback device 24 having an optical display unit 25, by means of which information concerning the state of the scrubber vacuum 10 is displayable. The display unit 25 in particular includes a color display which may display a multiplicity of colors.

In addition, the operating unit 12 includes a single receptacle 26 for authorization carriers, which are required for access to the scrubber vacuum 10.

Figure 4:
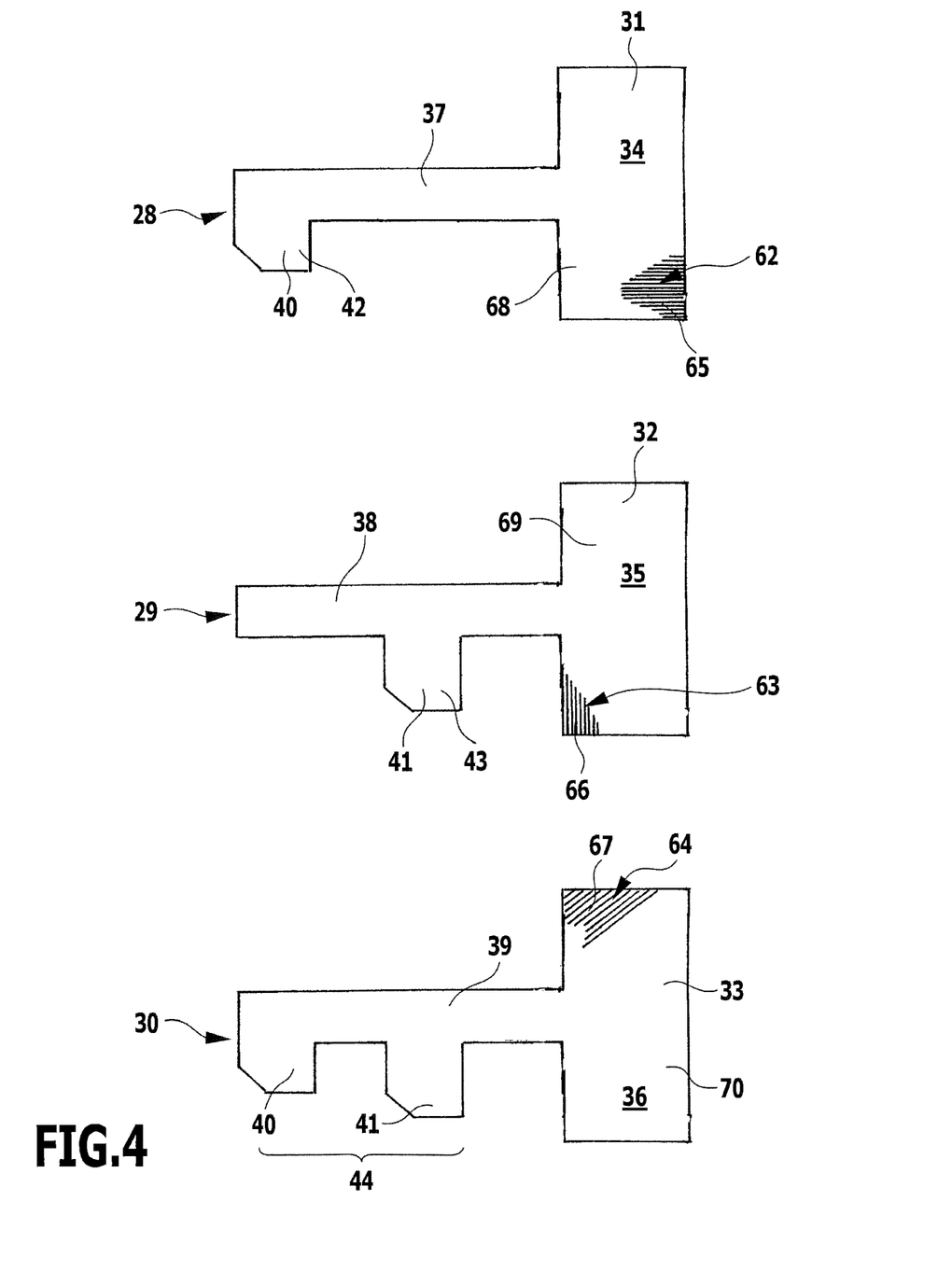
FIG. 4 shows a group of three authorization carriers of different authorization profiles in a schematic illustration, each of which grants access to the cleaning appliance from FIG. 1.

The scrubber vacuum 10 includes a total of three authorization carriers 28 to 30, which are schematically illustrated in FIG. 4. The authorization carriers 28 to 30 are in each case configured as mechanical keys 31, 32, and 33, respectively. Each of the keys 31 to 33 comprises a handle element 34, 35, and 36, respectively. Support elements 37, 38 and 39 protrude from the handle elements 34 to 36, respectively, for projections formed on the keys 31 to 33, respectively. The key 33 has two projections 40 and 41 which are spaced apart from one another, while the key 31 has only the projection 40, and the key 32 has only the projection 41.

The projection 40 of the key 31 forms the access authorization 32 thereof for accessing the scrubber vacuum 10. Similarly, the projection 41 of the key 32 forms the access authorization 43 thereof for accessing the scrubber vacuum 10. The projections 40 and 41 together form an access authorization 44 of the key 33 for accessing the scrubber vacuum 10.

Figure 3A:
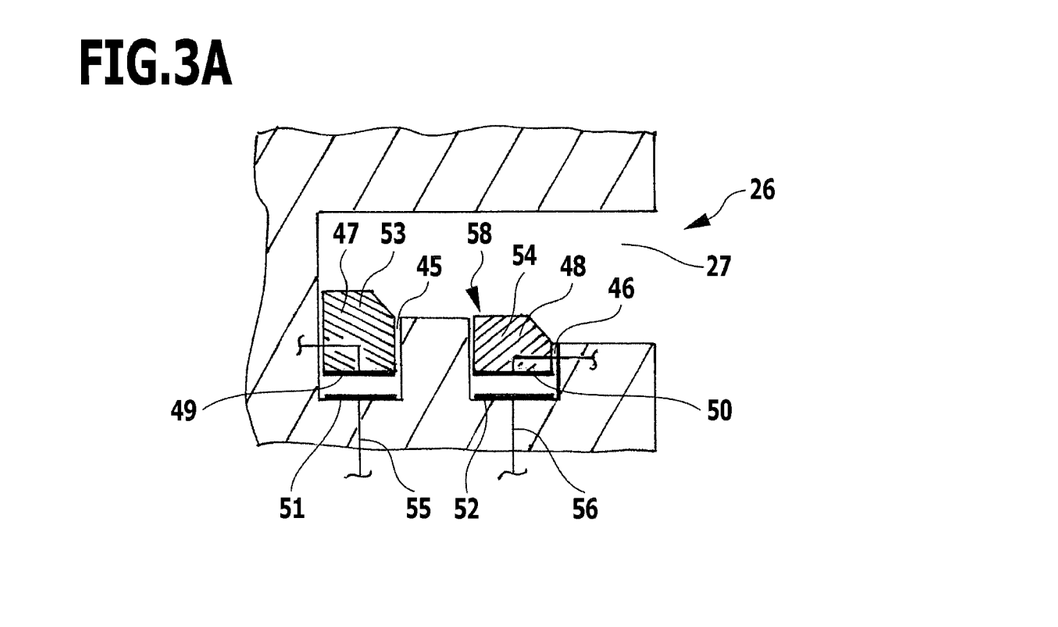
FIG. 3A shows a sectional view along the line 3-3 in FIG. 2, without an authorization carrier positioned in the receptacle.

Two recesses 45 and 46 branch from the key slot 27 transversely with respect to the insertion direction of the keys 31 to 33 in the key slot 27. Detection contact elements 47 and 48 are displaceably mounted, transversely with respect to the insertion direction of the keys 31 to 33, in the recesses 45 and 46, respectively. The detection contact elements 47 and 48 are biased in the direction of the key slot 27 by means of biasing elements, not illustrated in the drawing. The range of motion of the detection contact elements in the direction of the key slot 27 is delimited by stops, likewise not illustrated in the drawing.

Figure 5:
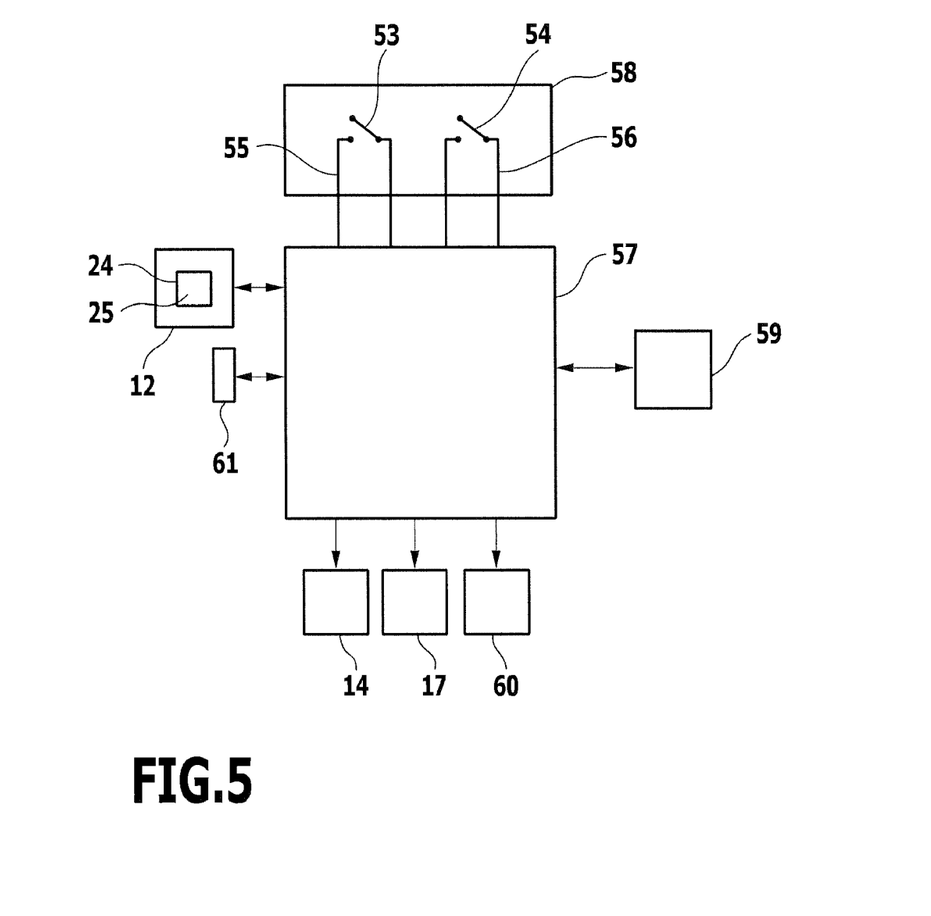
FIG. 5 shows a block diagram of electrically active components of the cleaning appliance from FIG. 1.

The detection contact elements 47 and 48 comprise an electrical contact 49 and 50, respectively, facing away from the key slot 27. The contacts 49 and 50 may interact with electrical contacts 51 and 52, respectively, situated at the base of the recesses 45 and 46, respectively, in order to establish an electrical connection. In this manner, these detection contact elements 47 and 48 form switching elements 53 and 54, respectively, which are connected in electrical switch lines 55 and 56, respectively. The switch lines 55 and 56 contact the contacts 49 and 51, and 50 and 52, respectively. The switching elements 53 and 54 are coupled via the switch lines 55 and 56, respectively, to a control unit 57 of the scrubber vacuum 10, which is schematically illustrated in FIG. 5.

The switching elements 53 and 54 together with the electrical contacts 51 and 52, respectively, form a detection unit 58, situated at the receptacle 26, for contact-based detection of the access authorizations 42 to 44 of the keys 31 to 33, respectively. This is illustrated by way of example in FIG. 3B with reference to the key 31. When the key 31 is inserted into the key slot 27, the projection 40 comes into mechanical contact with the detection contact element 47. The detection contact element 47 is displaced in the recess 45, thus activating the switching element 53. The activation of the switching element 53 may be detected by the control unit 57 as a short circuit of the switch line 55. The access authorization 42 of the key 31 may be transmitted to the control unit 57 in this way.

Figure 3B:
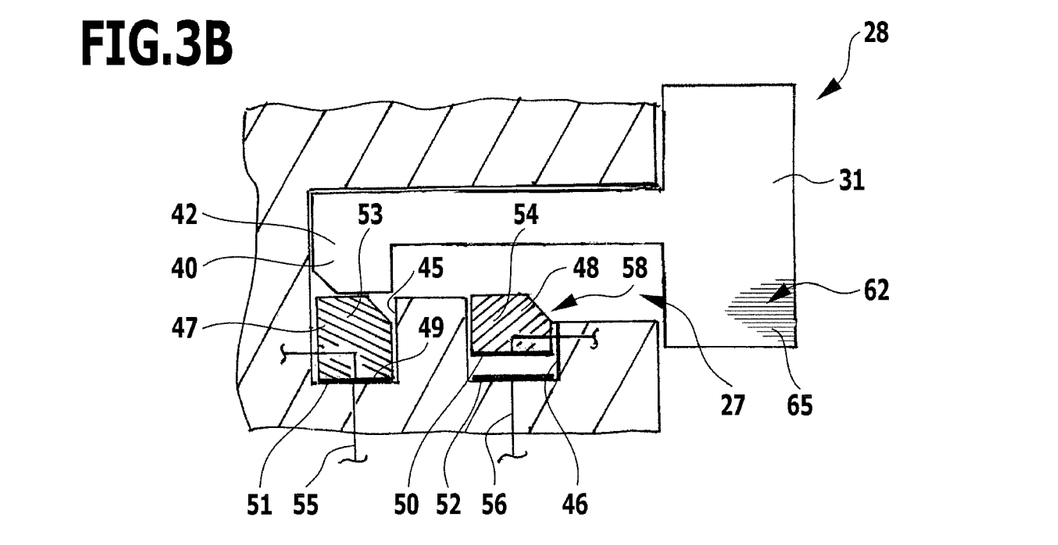
FIG. 3B shows a sectional view along the line 3-3 in FIG. 2, with an authorization carrier positioned in the receptacle.

The access authorization 43 of the key 32 may be similarly transmitted to the control unit 57. When the key 32 is inserted into the key slot 27, the projection 41 contacts the detection contact element 48. The resulting activation of the switching element 54 may be detected by the control unit 57 as a short circuit of the switch line 56.

Furthermore, the access authorization 44 of the key 33 may be detected in a similar manner. When the key 33 is inserted into the key slot 27, the projections 40 and 41 contact the detection contact elements 47 and 48, respectively. The resulting activations of the switching elements 53 and 54 may be detected by the control unit 57 as short circuits of the switch lines 55 and 56, respectively.

As shown by the above description, a plurality of access authorizations 42 to 44 of the keys 31 to 33, respectively, may be detected at only a single receptacle 26 by means of the detection unit 58. Depending on which of the switching elements 53 and/or 54 is/are activated, the control unit 57 may detect the access authorization 42, 43, or 44, and determine which of the keys 31, 32, or 33, respectively, the operator is using for access to the scrubber vacuum 10.

Access to the scrubber vacuum 10 is not possible without at least one of the switching elements 53 or 54 being activated. Thus in every case, an authorization carrier is necessary for accessing the scrubber vacuum 10 with a valid access authorization.

The control unit 57 is in operative connection with a memory unit 59 of the scrubber vacuum 10. Different authorization profiles are stored in the memory unit 59, each of the access authorizations 42 to 44 being linked to a different authorization profile. The authorization profile stores which of the totality of available functions of the scrubber vacuum 10 may be performed by the operator holding the particular keys 31 to 33 used.

For example, it may be provided that it is stored in the authorization profile that the operator may use only selected functional units of the scrubber vacuum 10. Examples of the functional units of the scrubber vacuum 10 are the cleaning tool 14 and the dirt pick-up device 17, which likewise are controllable by the control unit 25, as well as a cleaning agent dispensing device 60 (schematically shown in FIG. 5). The quantity of cleaning fluid which acts on the floor surface as well as the quantity and type of a cleaning chemical added to this cleaning fluid may be set by means of the cleaner dispensing device 60.

It is also conceivable that it is stored in the authorization profile that the operator is able to use functional units such as the cleaning tool 14, the dirt pick-up device 17, or the cleaner dispensing device 60 with current cleaning parameters, but is not able to change these cleaning parameters. Examples of cleaning parameters are the contact pressure of the disk brush 15 on the floor surface, the negative pressure applied by the suction bar 18 for picking-up dirty liquid, or the quantity of a cleaning chemical added to the cleaning fluid.

It is also possible that it is stored in the authorization profile whether the operator is authorized to transmit software updates to the control unit 57 via an interface 61, schematically illustrated in FIG. 5, or to electronically query via the interface 61 the status of a scrubber vacuum 10, for example to read out an error log stored in the memory unit 59.

Providing the authorization profile which is linked to the particular access authorization 42 to 44 allows operators to carry out various functions of the scrubber vacuum 10, depending, for example, on the range of duties, level of knowledge, and experience in handling the scrubber vacuum 10. In dependence on the particular authorization profile, the scrubber vacuum 10 thereby provides the operator with a different range of functions.

In the present case, with regard to their authorization profiles, the keys 31 to 33 differ in that the key 31 having the access authorization 42 is provided only for operators with "standard experience." The key only grants access to a range of functions which covers the elementary basic functions of the scrubber vacuum 10, such as use of the cleaning tool 14, of the dirt pick-up device 17, and of the cleaner dispensing device 60.

In contrast, the key 32 having the access authorization 43 is provided for more experienced operators, with whose authorization profile all regular functions of the scrubber vacuum 10 may be accessed. In particular, cleaning parameters of the cleaning tool 14, of the dirt pick-up device 17, and of the cleaner dispensing device 60 may be changed.

The key 33 having the access authorization 44 is reserved solely for maintenance personnel. With his authorization profile, the maintenance person may access all functions of the scrubber vacuum 10, and also the interface 61, for example.

As shown by the above description, the authorization profiles of the keys 31 to 33 define in particular authorization stages which build on one another, a higher-order authorization stage including the range of functions of a lower-order authorization stage and at least one additional function of the scrubber vacuum 10.

It may be provided that the scrubber vacuum 10 comprises more than only one key having a specific access authorization. Typically, the scrubber vacuum 10 will include many keys of the type 31, a smaller number of keys of the type 32, and an even smaller number of keys of the type 33.

To allow an operator to recognize in a particularly simple and reliable manner which authorization profile the particular key 31, 32, or 33 has, all keys 31 to 33 include identification devices 62, 63, and 64, respectively, of the same kind. By means of the identification devices 62 to 64, the operator is provided with identifiers 65, 66, and 67, respectively, which may be perceived by the operator via a sensory organ, and are associated with the particular authorization profile of the keys 31, 32, and 33, respectively, and linked to the access authorization 42, 43, and 44, respectively.

All identification devices 62 to 64 are optical identification devices whose identifiers 65 to 67, respectively, are perceivable by an operator's sense of vision. The identifiers 65 to 67 are in particular color identifiers which consist in the keys 31, 32, and 33, respectively, being colored; i.e., the identifiers 65 to 67 each comprise a color being applied to surfaces 68, 69, and 70 of the keys 31, 32, and 33, respectively. The identification devices 62 to 64 are formed by the surfaces 68 to 70, respectively, having the colored layers thereon which bring about the particular color impression.

The colored identifiers 65 to 67, schematically illustrated in FIG. 4 by different cross-hatching, each extend over the entire surface 68, 69 and 70, respectively. They may thus be visually perceived by the operator in a particularly simple manner, regardless of how the particular key 31, 32, and 33 is observed. The surfaces 68 to 70 form, in a manner of speaking, identifier areas of the identification devices 62 to 64, respectively.

For example, in the present case the identifier 65 has a yellow color, the identifier 66 has a red color, and the identifier 67 has a gray color. In the present context, "color" may mean a basic color in general, as well as a specific color, for example in the Pantone color system.

Due to the colored identifier which is visually perceivable in a simple manner, the keys 31 to 33 may be easily kept separate by the operator, which simplifies their handling, and thus, the handling of the scrubber vacuum 10 as a whole.

If two or more keys of the same authorization profile are provided, they preferably have the same identifier, even if the access authorization is different. This results in an unambiguous association of the authorization profile with the identifier, which further simplifies handling of the authorization carriers of the scrubber vacuum 10.

The operating unit 12 is in operative connection with the control unit 57, and in particular the display unit 25 is controllable by the control unit 57. If the authorization profile of the particular key 31, 32, or 33 is known to the control unit 57, the control unit 57 controls the display unit 25 in such a way that authorization information is provided which is linked to the authorization profile of the key used.

In the present case, the authorization information has a display color of the display unit 25 which matches the color of the particular identifier 65 to 67. In the present context, "display color" may be the background color of the display unit 25, or its foreground color, for example for text that is output on the display unit 25. The purpose of the authorization information, for example, is to determine whether the particular authorization carrier used is correctly identified. If the display color differs from the color of the particular identifier of the authorization carrier, a misidentification is present. The operator may then have the identifier corrected.

The invention claimed is:

1. A cleaning appliance comprising at least one authorization carrier with an access authorization which is provided thereon and is required for accessing the cleaning appliance, just one receptacle in which the at least one authorization carrier is positionable, and a detection unit, situated at the receptacle, for contact-based detection of the access authorization of an authorization carrier positioned in the receptacle, the detection unit having at least one detection contact element which contacts the access authorization, wherein the cleaning appliance comprises two or more authorization carriers with access authorizations provided thereon which are linked to different authorization profiles, wherein a range of functions dependent on the authorization profile linked to an access authorization is provided to an operator by the cleaning appliance.

2. The cleaning appliance according to claim 1, wherein the at least one detection contact element forms a switching element which is activatable by contact with the access authorization.

3. The cleaning appliance according to claim 2, wherein the detection unit has two or more detection contact elements which form two or more switching elements that are activatable in dependence on the particular access authorization of an authorization carrier.

4. The cleaning appliance according to claim 2, wherein the cleaning appliance includes a control unit, coupled to the at least one switching element, by means of which the activation of the at least one switching element is detectable.

5. The cleaning appliance according to claim 4, wherein the cleaning appliance includes a memory unit which is coupled to the control unit and which stores the authorization profile linked to an access authorization.

6. The cleaning appliance according to claim 1, wherein the authorization carriers are configured as keys, and that the receptacle is a key slot for the keys.

7. The cleaning appliance according to claim 1, wherein the cleaning appliance comprises a plurality of authorization carriers having the same authorization profile.

8. The cleaning appliance according to claim 1, wherein the cleaning appliance comprises a plurality of authorization carriers having identical access authorizations provided thereon.

9. The cleaning appliance according to claim 1, wherein the authorization profiles of the authorization carriers define authorization stages which build on one another, whereby when a higher-order authorization stage is present, the cleaning appliance may provide the range of functions of a lower-order authorization stage and at least one additional function.

10. The cleaning appliance according to claim 1, wherein each authorization carrier includes an identification device for providing an identifier which is associated with each authorization profile of the authorization carrier and which is perceivable by the operator using a sensory organ, wherein identifiers associated with different authorization profiles are different from one another.

11. The cleaning appliance according to claim 10, wherein the cleaning appliance comprises a plurality of authorization carriers having the same authorization profile, and that the plurality of authorization carriers has identical identifiers.

12. The cleaning appliance according to claim 10, wherein at least one identification device is an optical identification device having a visually perceivable identifier.

13. The cleaning appliance according to claim 12, wherein the visually perceivable identifier is a color.

14. The cleaning appliance according to claim 10, wherein the identifier of at least one authorization carrier is situated on a surface of the authorization carrier.

15. The cleaning appliance according to claim 14, wherein the identifier extends over the entire surface of the authorization carrier.

16. The cleaning appliance according to claim 1, wherein the cleaning appliance includes a playback device for providing authorization information which is perceivable by the operator using a sensory organ, the authorization information being associated with the authorization profile of an authorization carrier used by the operator for accessing the cleaning appliance.

17. The cleaning appliance according to claim 16, wherein the playback device includes an optical display unit for providing visually perceivable authorization information.

18. The cleaning appliance according to claim 17, wherein in the case of an identifier of the authorization profile of the authorization carrier based on a color, the authorization information is a display color of the display unit.

19. The cleaning appliance according to claim 18, wherein the color of the identifier and the display color match.

* * * * *